United States Patent
Carbune et al.

(10) Patent No.: US 12,356,041 B2
(45) Date of Patent: Jul. 8, 2025

(54) INTEGRATING SHORT-TERM CONTEXT FOR CONTENT PLAYBACK ADAPTION

(71) Applicant: Google LLC, Mountain View, CA (US)

(72) Inventors: Victor Carbune, Zürich (CH);
Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/349,658

(22) Filed: Jul. 10, 2023

(65) Prior Publication Data

US 2023/0353827 A1    Nov. 2, 2023

Related U.S. Application Data

(63) Continuation of application No. 17/103,908, filed on Nov. 24, 2020, now Pat. No. 11,722,731.

(51) Int. Cl.
*H04N 21/458* (2011.01)
*H04N 21/439* (2011.01)
(Continued)

(52) U.S. Cl.
CPC ....... *H04N 21/458* (2013.01); *H04N 21/4396* (2013.01); *H04N 21/44218* (2013.01); *H04N 21/4532* (2013.01); *H04N 21/466* (2013.01); *H04N 21/47202* (2013.01); *H04N 21/47217* (2013.01)

(58) Field of Classification Search
None
See application file for complete search history.

(56) References Cited

U.S. PATENT DOCUMENTS

| 8,706,096 B2 | 4/2014 | Cannon et al. |
| 2010/0157978 A1* | 6/2010 | Robbins ........... H04N 21/44209 370/352 |

(Continued)

FOREIGN PATENT DOCUMENTS

| CN | 110347367 A | 10/2019 |
| KR | 10-2019-0098109 A | 8/2019 |

(Continued)

OTHER PUBLICATIONS

Maja Pantic et al: "Active Learning of Introductory Machine Learning" Frontiers in Education Conference, 36th Annual, IEEE, PI, Oct. 1, 2006 (Oct. 1, 2006), pp. 1-6, XP031054270, ISBN: 978-1-4244-0256-4.

(Continued)

*Primary Examiner* — Michael B. Pierorazio
(74) *Attorney, Agent, or Firm* — Honigman LLP; Brett A. Krueger; Grant Griffith

(57) ABSTRACT

While an assistant-enabled device is playing back media content, a method includes receiving a contextual signal from an environment of the assistant-enabled device and executing an event recognition routine to determine whether the received contextual signal is indicative of an event that conflicts with the playback of the media content from the assistant-enabled device. When the event recognition routine determines that the received contextual signal is indicative of the event that conflicts with the playback of the media content, the method also includes adjusting content playback settings of the assistant-enabled device.

18 Claims, 5 Drawing Sheets

(51) Int. Cl.
*H04N 21/442* (2011.01)
*H04N 21/45* (2011.01)
*H04N 21/466* (2011.01)
*H04N 21/472* (2011.01)

(56) References Cited

U.S. PATENT DOCUMENTS

| | | | |
|---|---|---|---|
| 2014/0201767 A1* | 7/2014 | Seiden | H04N 21/4325 725/12 |
| 2016/0149547 A1 | 5/2016 | Rider et al. | |
| 2018/0084310 A1* | 3/2018 | Katz | H04H 60/66 |
| 2019/0372541 A1 | 12/2019 | Friant et al. | |
| 2020/0117416 A1 | 4/2020 | Vega Zayas et al. | |
| 2020/0186382 A1 | 6/2020 | Harel et al. | |
| 2020/0314495 A1 | 10/2020 | Wittke | |
| 2021/0027065 A1* | 1/2021 | Chung | H04N 21/6582 |

FOREIGN PATENT DOCUMENTS

| | | |
|---|---|---|
| WO | 2013014886 A1 | 1/2013 |
| WO | 2019/149160 A1 | 8/2019 |

OTHER PUBLICATIONS

Feb. 24, 2022 Written Opinion (WO) of the International Searching Authority (ISA) and International Search Report (ISR) issued in International Application No. PCT/US2021/059036.
Office Action issued in related Korean Patent Application No. 10-2023-7034600, dated Jan. 31, 2025.

\* cited by examiner

INTEGRATING SHORT-TERM CONTEXT FOR CONTENT PLAYBACK ADAPTION

CROSS-REFERENCE TO RELATED APPLICATIONS

This U.S. patent application is a continuation of, and claims priority under 35 U.S.C. § 120 from, U.S. patent application Ser. No. 17/103,908, filed on Nov. 24, 2020. The disclosure of this prior application is considered part of the disclosure of this application and is hereby incorporated by reference in its entirety.

TECHNICAL FIELD

This disclosure relates to integrating short-term context for content playback adaption.

BACKGROUND

The use of digital assistants to stream music from smart speakers and mobile devices is common in user environments, such as a home or office. In addition to music, digital assistants are also used to play video content through smart players. Playback content, such as playback audio and/or video, from these devices may interfere with on-going conversations or activity in an environment of the user. For instance, the playback content may interfere with a conversation two users are having in the environment or a conversation a user is having over a phone call. In such situations, a user will manually tune the device to control the playback content from interfering with a current user activity. For example, a user may walk over to a smart speaker playing back music and lower/mute the volume so that it no longer interferes with the user's activity. In other situations, loud playback audio from a device may make it difficult from a user noticing an on-going event that requires the user's attention, such as a timer going off, an incoming phone call, or a baby crying through a baby monitor.

SUMMARY

One aspect of the disclosure provides a method of adjusting playback settings of an assistant-enabled device. While the assistant-enabled device is playing back media content, the method includes: receiving, at data processing hardware of the assistant-enabled device, a contextual signal from an environment of the assistant-enabled device; executing, by the data processing hardware, an event recognition routine to determine whether the received contextual signal is indicative of an event that conflicts with the playback of the media content from the assistant-enabled device; and when the event recognition routine determines that the received contextual signal is indicative of the event that conflicts with the playback of the media content, adjusting, by the data processing hardware, content playback settings of the assistant-enabled device.

Implementations of the disclosure include one or more of the following optional features. In some implementations, the contextual signal includes at least one of audio detected by a microphone of the assistant-enabled device or image data captured by an image capture device of the assistant-enabled device. In other implementations, the contextual signal includes network-based information from a user account shared with a nearby device in the environment of the assistant-enabled device. Here, the network-based information indicates an event associated with the nearby device.

The contextual signal may include a communication signal transmitted from a nearby device in communication with the assistant-enabled device. The communication signal indicates an event associated with the nearby device.

In some examples, executing the event recognition routine includes executing a neural network-based classification model configured to receive the contextual signal as input and generate, as output, a classification result indicating whether the received contextual signal is indicative of one or more events that conflict with the playback of the media content from the assistant-enabled device. In these examples, the contextual signal received at the neural network-based classification model as input includes an audio stream and the classification result generated by the neural network-based classification model as output includes an audio event that conflicts with the playback of the media content. Further, the classification result generated by the neural network-based classification model as output may be further based on an audible level of the audio stream. Alternatively, in these examples, the contextual signal received at the neural network-based classification model as input includes an image stream and the classification result generated by the neural network-based classification model as output comprises an activity event that conflicts with the playback of the media content.

In some implementations, when the received contextual signal is indicative an audio event, the method also includes: obtaining, by the data processing hardware, an audible level associated with the audio event; obtaining, by the data processing hardware, an audible level of the media content playing back from the assistant-enabled device; and determining, by the data processing hardware, a likelihood score indicating a likelihood that the media content playing back from the assistant-enabled device interrupts an ability of a user associated with the assistant-enabled device to hear the audio event. Here, adjusting the content playback settings of the assistant-enabled device includes one of, based on the likelihood score: lowering the audible level of the media content playing back from the assistant-enabled device; or stopping/pausing the playback of the media content from the assistant enabled device.

In additional implementations, when the event recognition routine determines that the received contextual signal is indicative of the event that conflicts with the playback of the media content, the method also includes: obtaining, by the data processing hardware, playback features associated with the media content playing back from the assistant-enabled device; obtaining, by the data processing hardware, event-based features associated with the event; and determining, by the data processing hardware, using a trained machine learning model configured to receive the playback features and the event-based features as input, a likelihood score indicating a likelihood that the media content playing back from the assistant-enabled device interrupts an ability of a user associated with the assistant-enabled device to recognize the event. Here, adjusting the content playback settings of the assistant-enabled device is based on the likelihood score. The event-based features may include at least one of an audio level associated with the event, an event type, or event importance. The playback features may include at least one of an audible level of the media content playing back from the assistant-enabled device, a media content type, or playback importance. In these implementations, after adjusting the content playback settings of the assistant-enabled device, the method may also include: obtaining, by the data processing hardware, user feedback indicating one of: acceptance of the adjusted content playback settings; or a subsequent manual adjustment to the content playback settings of the assistant-enabled device; and executing, by the data processing hardware, a training process that retrains the machine learning model on the obtained playback features, the obtained event-based features, the adjusted content playback settings, and the obtained user feedback.

Adjusting the content playback settings of the assistant-enabled device may include at least one of increasing/decreasing an audio level of the playback of the media content, stopping/pausing the playback of the media content, or instructing the assistant-enabled device to playback a different type of media content. In some examples, the method also includes receiving, at the data processing hardware, user-defined configuration settings indicating user preferences for adjusting the content playback settings of the assistant-enabled device. Here, adjusting the content playback settings of the assistant-enabled device is based on the user-defined configuration settings.

Another aspect of the disclosure provides a system for adjusting playback settings of an assistant-enabled device. The system includes data processing hardware and memory hardware in communication with the data processing hardware. The memory hardware stores instructions that when executed on the data processing hardware cause the data processing hardware to perform operations including, while an assistant-enabled device is playing back media content: receiving a contextual signal from an environment of the assistant-enabled device; executing an event recognition routine to determine whether the received contextual signal is indicative of an event that conflicts with the playback of the media content from the assistant-enabled device; and when the event recognition routine determines that the received contextual signal is indicative of the event that conflicts with the playback of the media content, adjusting content playback settings of the assistant-enabled device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
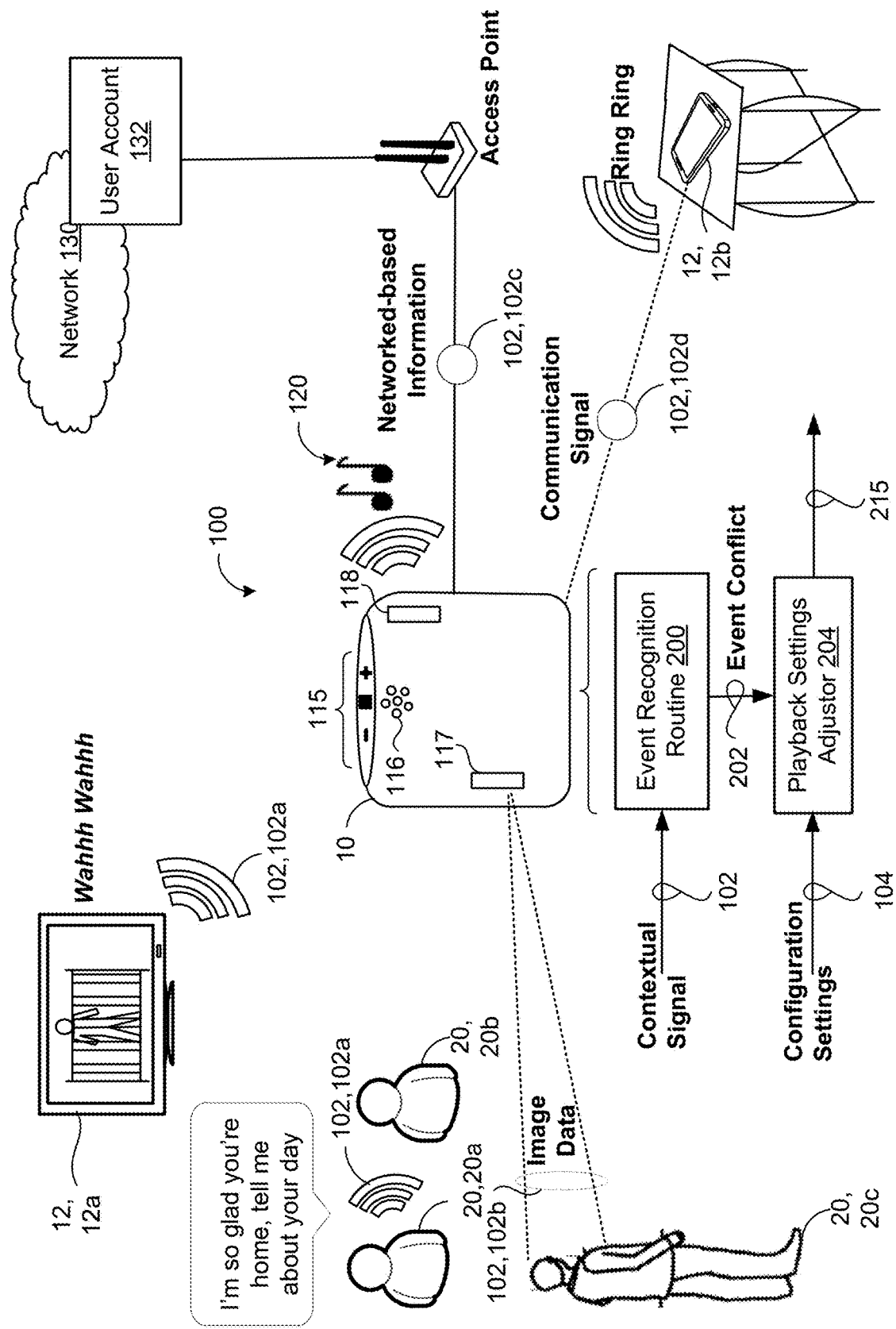
FIG. 1 is an example environment of an assistant-enabled device adapting playback settings based on received contextual signals.

The use of digital assistants to stream media content such as music from smart speakers and mobile devices is common in user environments, such as a home or office. In addition to music, digital assistants are also used to play video content through smart players. Playback content, such as playback audio and/or video associated with media content, from these devices may interfere with on-going conversations or activity in an environment of the user. For instance, the playback content may interfere with a conversation two users are having in the environment or a conversation a user is having over a phone call. In such situations, a user will manually tune the device to control the playback content from interfering with a current user activity. For example, a user may walk over to a smart speaker playing back music and lower/mute the volume so that it no longer interferes with the user's activity.

In other scenarios, loud playback audio from a smart speaker may inhibit a user from noticing an event that may require the user's attention. For example, while a speaker is playing music at a high volume level, a user may not hear a timer going off, an incoming phone call, or a baby crying through a baby monitor. In these situations, it would be desirable to lower or mute the volume level of the playback audio from the smart speaker for at least a brief period of time so that the user can hear the event that may require the user's attention. In the contrary, if a user were streaming music while sitting on his/her porch and heavy rain started, it would be desirable to increase the volume level of the playback audio from the smart speaker so that the user's listening experience is not interrupted by the sudden increase in background noise due to rain falling on the roof of the user's porch.

Implementations herein are directed toward digital assistants integrating environmental cues and contextually adapting content playback settings based on the environmental cues. This contextually adapting of playback settings on assistant-enabled devices enables an improved user experience and better interaction of the user with the surrounding environment or context. While playing back media content (e.g., playback audio), an assistant-enabled device, and/or another device in communication (e.g., paired) with the assistant-enabled device, may detect environmental cues such as sounds other than the playback audio from the assistant-enabled device or conversations occurring in the environment. Responsive to detecting one of these environmental cues, the assistant-enabled device may automatically mute, lower, or raise the volume level of the media content. In some examples, the assistant-enabled device adaptively learns how to contextually adapt the content of playback settings based on user preference and/or past behavior by the user in the same or similar contexts. For example, if a volume level of streaming music from a smart speaker in a kitchen of the user is always manually lowered immediately after a conversation starts in proximity of the smart speaker, the smart speaker may learn to contextually adapt to automatically lowering the volume level responsive to a conversation starting. In a similar example, the user may always momentarily mute the volume from the smart speaker when a sound of a baby crying is output from a baby monitor in the kitchen. Here, the smart speaker may draw a correlation that each time the user manually muted the volume of the smart speaker in the evening, the smart speaker had previously detected a particular noise (e.g., the sound of the baby crying) just moments before the volume was muted. As such, the smart speaker may contextually adapt to automatically mute the volume level responsive to detecting the particular noise of the baby crying.

Referring to FIG. 1, in some implementations, an environment 100 includes an assistant-enabled device 10 playing back media content 120. The media content 120 may include music or audio a user 20 of the assistant-enabled device 10 is listening to. The user 20 may interact with the assistant-enabled device 10 through speech. In some examples, the user 20 commands the assistant-enabled device 10 to playback the media content 120 through a speaker of the device 10. The device 10 may include manual controls 115 for adjusting playback settings of the device 10. For instance, the controls 115 may include, without limitation, at least one of volume adjustment, play/pause, stop, power, or activating a microphone 116 of the device 10. The microphone 116 may capture acoustic sounds such as speech directed toward the user device. The microphone 116 is also configured to capture acoustic noises indicative of acoustic events that may conflict with the playback of the media content 120 from the device. The assistant-enabled device 10 may receive voice commands following detection of a particular term (e.g., a hotword) that invokes the assistant-enabled device 10 to process voice commands (or transmit audio corresponding to voice commands to a server for processing). Thus, the assistant-enabled device 10 may employ on-device speech recognition and/or server-side speech recognition capabilities responsive to detecting the particular term. The particular term may be predefined or a custom word or phrase set by the user. The device may listen for multiple different particular terms, each configured to trigger the device to process voice commands/queries.

In the example shown, the assistant-enabled device 10 receives various contextual signals 102 from the environment 100 that may be indicative of events that conflict with the playback of the media content 120. Specifically, the device 10 executes an event recognition routine 200 to determine whether or not a received contextual signal is indicative of an event that conflicts with the playback of the media content. When the event recognition routine 200 determines that the received contextual signal is indicative of the event that conflicts with the playback of the media content, the routine 200 passes an event conflict signal 202 to a playback settings adjuster 204. The playback settings adjuster 204 may issue adjustment instructions 215 to adjust the current playback settings of the device 10. For instance, the instructions 215 may decrease a current volume setting or pause the playback of the media content 120 so that the user can hear or otherwise recognize the presence of the event that the user may want to attend to.

The user may provide configurations settings 104 (e.g., via a graphical user interface of an assistant application and/or via speech) that allow a user to customize how the adjuster 204 adjusts playback settings. For instance, the configuration settings 104 may rank events that the user 10 is interested in and assign corresponding playback settings for the device 10 to apply when a received contextual signal 102 is indicative of the corresponding event. In some examples, the configuration settings 104 specify a specific type of media content 120 to switch to responsive to receiving a contextual signal indicative of an activity event. For example, if image data 102b is received for an individual (or even a specific individual) entering the environment, the configuration settings 104 may specify that the playback settings adjustor 204 is to switch from playing rock music to jazz music.

In some examples, the contextual signal 102 includes audio 102a detected by the microphone 116. For instance, the audio 102a may be associated with a baby crying output from a nearby device 12 (e.g., a baby monitor 12a located in the environment) as a corresponding audio stream in the environment 100 or the audio 102a may include an audio stream corresponding to speech between two or more people 20a, 20b having a conversation. The audio 102a detected/captured by the microphone 116 may also include an audio stream corresponding to the sound of a nearby device 12 such as a phone 12b ringing when the phone 12b is receiving an incoming call. The event recognition routine 200 may determine that the audio 102a is indicative of an event conflict 202 that conflicts with the playback of the media content 120 to thereby cause the playback settings adjuster 204 to issue adjustment instructions 215 that adjust the playback settings of the assistant-enabled device, e.g., decreasing a volume level, so that a user can hear the audio 102a to be informed of the corresponding event. After adjusting the playback settings, the adjustor 204 may issue instructions to revert back to the previous settings when the event is over or a short period of time sufficient for the user to recognize the event.

In additional examples, the contextual signal 102 includes image data 102b captured by an image capture device 117 of the assistant-enabled device 10 or in communication with the device 10. For instance, the image data 102b may include an image stream indicative of an activity event that conflicts with the playback of the media content. In the example shown, a recent arrival of a person 20c entering the environment 100 may be indicative of an event conflict 202 identified by the event recognition routine based on image data 102b of the person 20c. In some examples, the adjustment instructions 215 issued by the playback settings adjustor 204 instruct the assistant-enabled device 10 to change the type of media content 120 currently being output to a different type due to the presence of the person 20c, e.g., the media content 120 output may switch from rock music to classical music.

In some implementations, the contextual signal 102 received at the assistant-enabled device 10 includes network-based information 102c from a user account 132 shared with a nearby device 12 in the environment 100 of the assistant-enabled device 10. Here, the network-based information 102c indicates an event associated with the nearby device 12. For example, the phone 12b may be registered to a same user account 132 as one of the registered users of the assistant-enabled device 10 such that when the phone 12b is receiving an incoming call, the user account 132 may transmit network-based information 102c to the assistant-enabled device 10 indicating the incoming call event associated with the phone 12c. In the example shown, the user account 132 may be managed in a cloud-computing environment that communicates with the assistant-enabled device 10 via a network 130. An access point, such as a modem/router or cellular base station, may route the network-based information 102c to the assistant-enabled device 10. The device 10 may include a wireless and/or wired communication interface for receiving the network-based information. Advantageously, the network-based information 102c may cause the event recognition routine 200 to identify the event conflict so that the playback settings adjustor 204 can adjust playback settings to permit the user to be made aware of the incoming call occurring at the phone 12b. Even when the phone 12b is silenced or vibrating, and thus not outputting audible alerts that could be captured by the microphone of the device 10, the network-based information 102c can indicate the presence of the incoming call.

The assistant-enabled device 10 may additionally receive a contextual signal 102 as a communication signal 102d transmitted from a nearby device 12 in communication with the assistant-enabled device, whereby similar to the network-based information 102c, the communication signal 102d indicates an event associated with the nearby device 12. In the example shown, the smart phone 12b transmits the communication signal 102d to the assistant-enabled device 10 wirelessly via Bluetooth, near-field communication (NFC), ultrasonic, infrared, or any other wireless or wired communication technology. The smart phone 12b may also transmit the communication signal 102d via wireless fidelity (Wi-Fi) or cellular via the access point to the assistant-enabled device 10. In this example, the communication signal 102d indicates the incoming call event. The smart phone 12b could transmit another communication signal 102d indicating when the has ended, thereby enabling the playback settings adjustor 204 to revert back to the previous playback settings. In other examples, an event associated with a nearby device 10 could include an alarm/alert/notification occurring at the nearby device or a timer sounding off at the nearby device 10 when the nearby device corresponds to a timer. In one example, a smart timer could provide the communication signal 102d immediately before a timer goes off and/or the communication signal 102d could indicate a time when the timer will sound off so that the playback settings adjustor 204 can adjust the playback settings by decreasing the volume so that the playback content 120 does not prevent the user from hearing the timer when it sounds off. Continuing with the example, the smart time could provide another communication signal 102d indicating when the timer has ended, thereby enabling the playback settings adjust 204 to revert back to the previous playback settings.

Figure 2A:
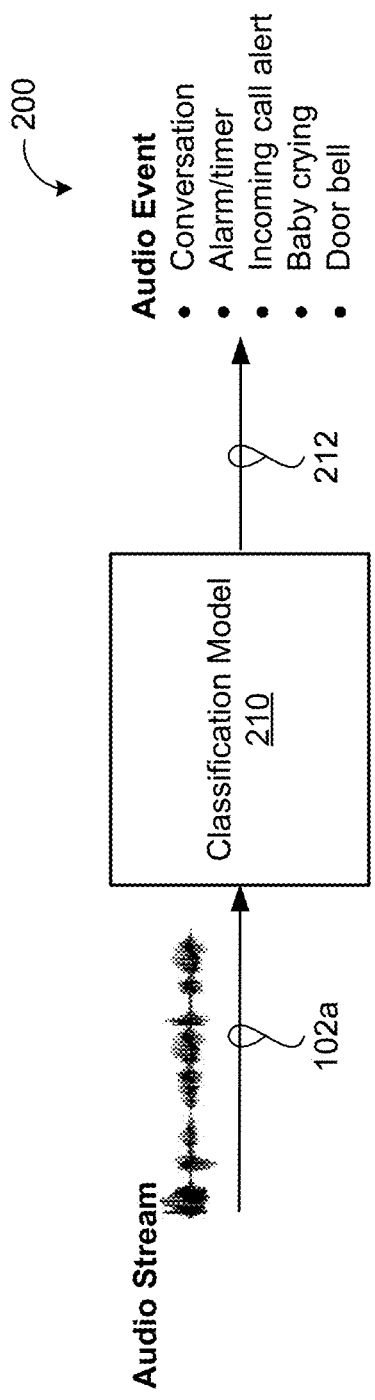
FIGS. 2A and 2B are examples of an event recognition routine executing on the assistant-enabled device of FIG. 1.
Figure 2B:
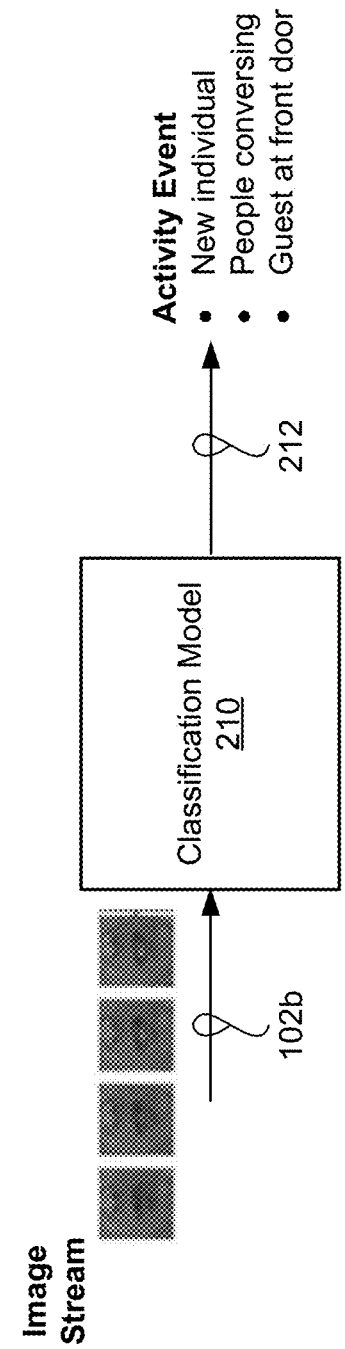

Referring to FIGS. 2A and 2B, in some implementations, executing the event recognition routine 200 on the assistant-enabled device 10 includes executing a neural network-based classification model 210 configured to receive the contextual signal 102 as input and generate, as output, a classification result 212. The classification result 212 output by the event recognition routine 200 indicates whether the received contextual signal 102 is indicative of one or more events that conflict with the playback of the media content 120 from the assistant-enabled device 10.

FIG. 2A shows the contextual signal 102 received at the neural network-based classification model 210 as input including an audio stream 102a and the classification result 212 generated by the neural network-based classification model 210 as output including an audio event that conflicts with the playback of the media content 120. For instance, the audio event (e.g., event conflict 202) 212 may include, without limitation, speech, an alarm, a timer, an incoming call, or some particular noise (e.g., a baby crying). In some implementations, the classification result 212 generated by the classification model 210 as output is further based on an audible level of the audio stream 102a and/or an audible level of the media content 120 output as playback from the assistant-enabled device. In these implementations, if the audible level of the audio stream 102a is louder than the audible level of the media content 120 the classification result 212 may indicate that the audio event does not conflict with the playback of the media content 120, thereby not requiring automatic lowering of the volume level of the assistant-enabled device. The classification result 212 could also indicate a magnitude of conflict so that the playback settings adjustor 204 can adjust the playback settings of the media content based on the magnitude of conflict, e.g., merely decreasing the audible level of the playback content 120 versus pausing/muting the playback content 120.

FIG. 2B shows the contextual signal 102 received at the neural network-based classification model 210 as input including an image stream 102b and the classification result 212 generated by the classification model 210 as output including an activity event that conflicts with the playback of the media content 120. For instance, the activity event may include a visitor or other individual entering the environment 10 or a guest at the front door. The activity event could also convey characteristics of two people conversing that may be combined with an audio event indicative of speech to indicate that a conversation is occurring that may conflict with the playback of the media content 120.

Figure 3:
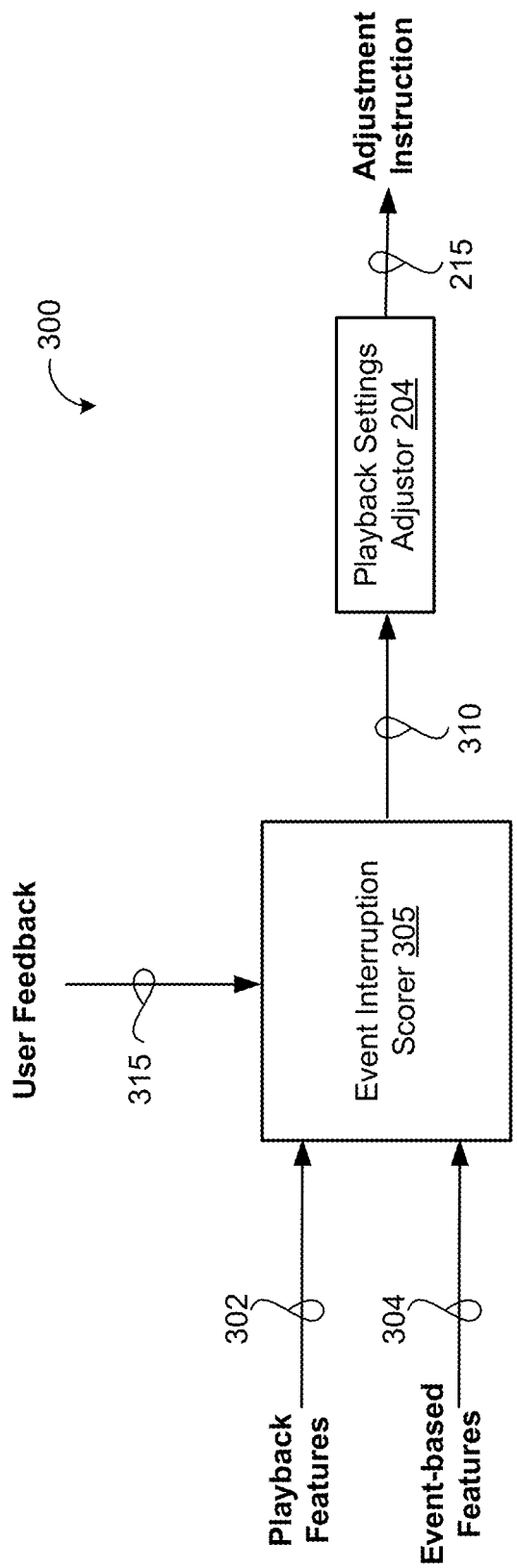
FIG. 3 is an example event interruption scorer configured to generate likelihood scores indicating likelihoods of events interrupting a user.

Referring to FIG. 3, in some implementations, the assistant-enabled device 10 further includes an event interruption scorer 305 configured to determine whether a received contextual signal recognized as being indicative of an event (e.g., as output from the event recognition routine 200) interrupts an ability of the to recognize the event. The scorer 305 may be a heuristically-based model or a trained machine learning model. In the example shown, the scorer obtains playback features 302 associated with the media content playing back from the assistant-enabled device 10 and event-based features 302 associated with the event as input, and generates, as output, a likelihood score 310 indicating a likelihood that the media content 120 playing back from the assistant-enabled device 10 interrupts the ability of the user to recognize the event. In some examples, the assistant-enabled device 10 could amplify acoustic features associated with the event for playback, reproduce the event for playback, and/or provide a semantic interpretation of the event.

In one example, when the received contextual signal 102 is indicative of an audio event, the playback features 302 and the event-based features 304 input to the scorer 305 include respective audible levels of the media content 120 playing back from the device 10 and the audio event. In this example, the likelihood score 310 output from the scorer 305 indicates the likelihood that the media content 120 playing back from the device 10 interrupts the ability of the user to hear the audio event. Accordingly, the playback setting adjustor 204 may receive the likelihood score 310 and issue adjustment instructions 215 based on the score 310 that causes the assistant-enabled device 10 to one of lower the audible level of the media content 120 playback from the device 10 or stop/pause the playback of the media content 120 from the device 10.

In additional examples, when the event recognition routine determines that the received contextual signal is indicative of the event that conflicts with the playback of the media content and the event interruption scorer 305 is a trained machine learning model, the trained machine learning model receives the playback features 302 and the event-based features 304 as input, and determines the likelihood score 310 indicating the likelihood that the media content 120 playback interrupts the ability of the user to recognize the event. The playback features 302 may include, without limitation, at least one of an audible level of the media content 120 playing back from the device, a media content type, or a playback importance indicator indicating a level of importance of the media content. For instance, media content associated with a video call between family members may be assigned a higher level of importance than media content associated with a music playlist such that the user may not want the device 10 to adjust the playback settings of the video call. In some examples, the importance indicator is based on user configuration settings 204 provided by the user as discussed above with reference to FIG. 1. The event-based features 304 may include, without limitation, at least one of an audio level associated with the event, an event type (audio event or activity event), or an event importance indicator. For instance, an audio even associated with a fire alarm may be assigned more importance for the user to hear than a phone ringing to inform a user of an incoming call. As with the media content importance indicator, the event importance indicator may be based on the user configuration settings 204.

When likelihood score 310 output from the trained machine learning model scorer 305 indicates the likelihood that the media content 120 playing back from the device 10 interrupts the ability of the user to recognize the event, the playback setting adjustor 204 may receive the likelihood score 310 and issue adjustment instructions 215 based on the score 310 that causes the assistant-enabled device 10 to one of lower the audible level of the media content 120 playback from the device 10, stop/pause the playback of the media content 120 from the device 10, or switch a type of media content being played back from the device 10. In some examples, the playback setting adjustor 204 may compare the score 310 to one or more thresholds for determining whether or not to issue adjustment instructions 215. For instance, if the score 310 does not satisfy an adjustment threshold, thereby indicating that the event does not likely interrupt an ability of the user to hear or otherwise recognize the event, then the playback setting adjustor 204 may not issue any adjustment instructions 215. Likewise, a score 310 that satisfies the adjustment threshold but not a second higher threshold may result in adjustment instructions 215 that merely decrease the audible level of the playback of the media content 120, whereas the score 310 satisfying the second hither threshold results in adjustment instructions 215 that pause/mute the playback of the media content 120.

In some implementations, when the event interruption scorer 305 includes the trained machine learning model, the scorer 305 is re-trained/tuned to adaptively learn to adjust playback settings for particular contextual signals 102 based on user feedback 315 received after the playback setting adjustor 204 issues (or does not issue) adjustment instructions 215. Here, the user feedback 315 may indicate acceptance of the adjusted content playback settings or a subsequent manual adjustment to the content playback settings via the manual controls 115 (FIG. 1). For example, if no adjustment was made to the playback settings or the audible level was merely lowered, user feedback 315 indicating a subsequent manual adjustment of lowering the audible level further or pausing the playback of the media content altogether may indicate that the event interrupted the user to extent greater than the associated likelihood score 310 indicated. As another example, acceptance of the adjusted content playback settings may be inferred by no subsequent manual adjustment to the content playback settings. The assistant-enabled device 10 may execute a training process that retrains the machine learning model scorer 305 on the obtained playback features 302, the obtained event-based features 304, the adjusted playback settings, and the obtained user feedback 315 so that the scorer 305 adaptively learns to output likelihood scores 310 personalized for the user based on past user behavior/reaction in similar contexts.

Figure 4:
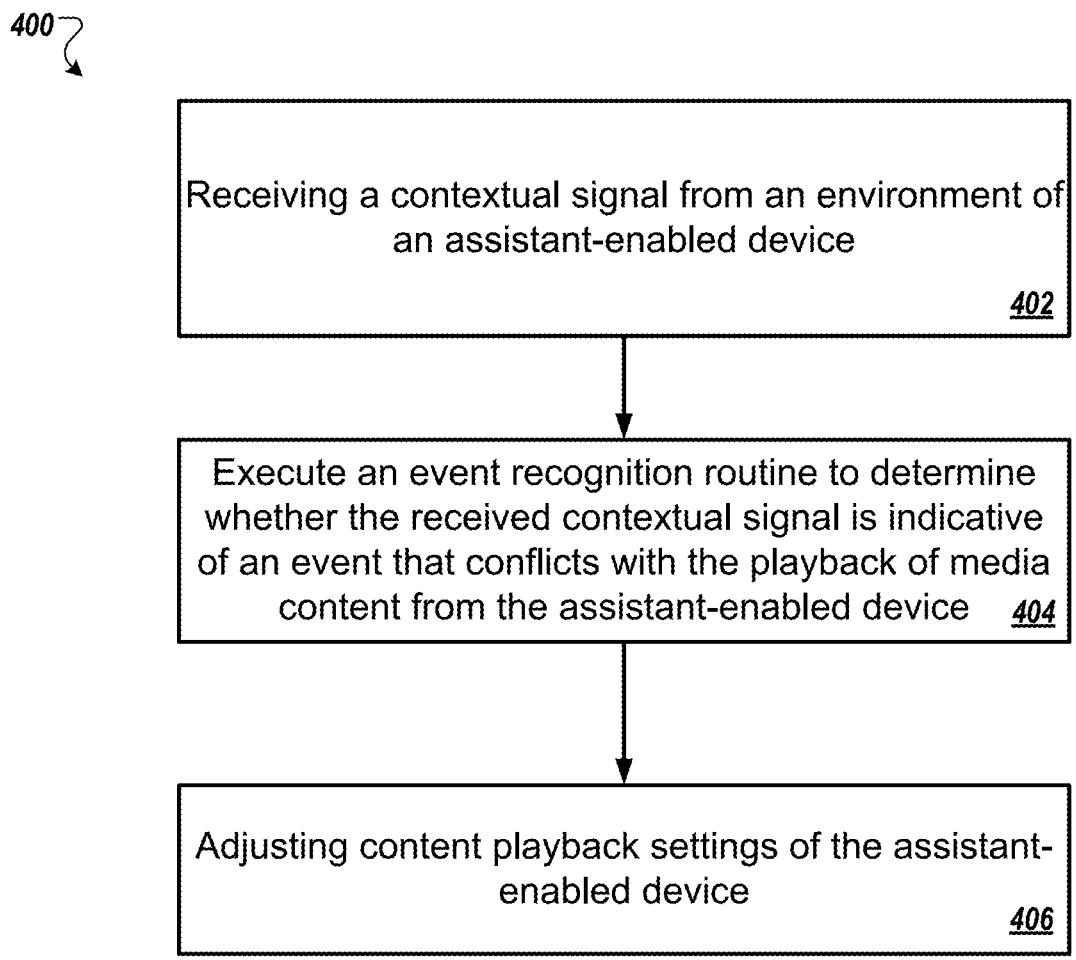
FIG. 4 is a flowchart of an example arrangement of operations for a method of adjusting playback settings of the assistant-enabled device of FIG. 1 based on received contextual signals.

FIG. 4 is a flowchart of an example arrangement of operations for a method 400 of adjusting content playback settings of an assistant-enabled device 10 based on contextual signals 102 received from an environment 100 of the assistant-enabled device 10. The operations may execute on data processing hardware 510 (FIG. 5) of the assistant-enabled device 10 based instructions stored on memory hardware 520 (FIG. 5) of the assistant-enabled device 10. At operation 402, the method 400 includes receiving a contextual signal 102 from the environment 100 of the assistant enabled device. The contextual signal 102 may include audio 102a detected by a microphone of the device 10, image data 102b captured by an image capture device, network-based information 102c from a user account 132 shared with a nearby device 12, or a communication signal 102d transmitted from a nearby device 12.

At operation 404, the method 400 includes executing an event recognition routine 200 to determine whether the received contextual signal 102 is indicative of an event that conflicts with the playback of the media content 120 from the assistant-enabled device 10. Executing the routine 200 may include executing a neural network-based classification model 210 configured to receive the contextual signal 102 as input and generate, as output, a classification result 212 indicating whether the received contextual signal 102 is indicative of one or more events that conflict with the playback of the media content 120 from the assistant-enabled device 10.

At operation 406, when the event recognition routine 200 determines that the received contextual signal 102 is indicative of the event that conflicts with the playback of the media content 120, the method 400 includes adjusting content playback settings of the assistant-enabled device 10. For instance, a playback setting adjustor 204 may issue adjustment instructions 215 that cause adjustment of the content playback settings. Adjusting the content playback settings of the assistant-enabled device 10 may include increasing/decreasing an audio level of the playback of the media content, stopping/pausing the playback of the media content, or instructing the assistant-enabled device to playback a different type of media content.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
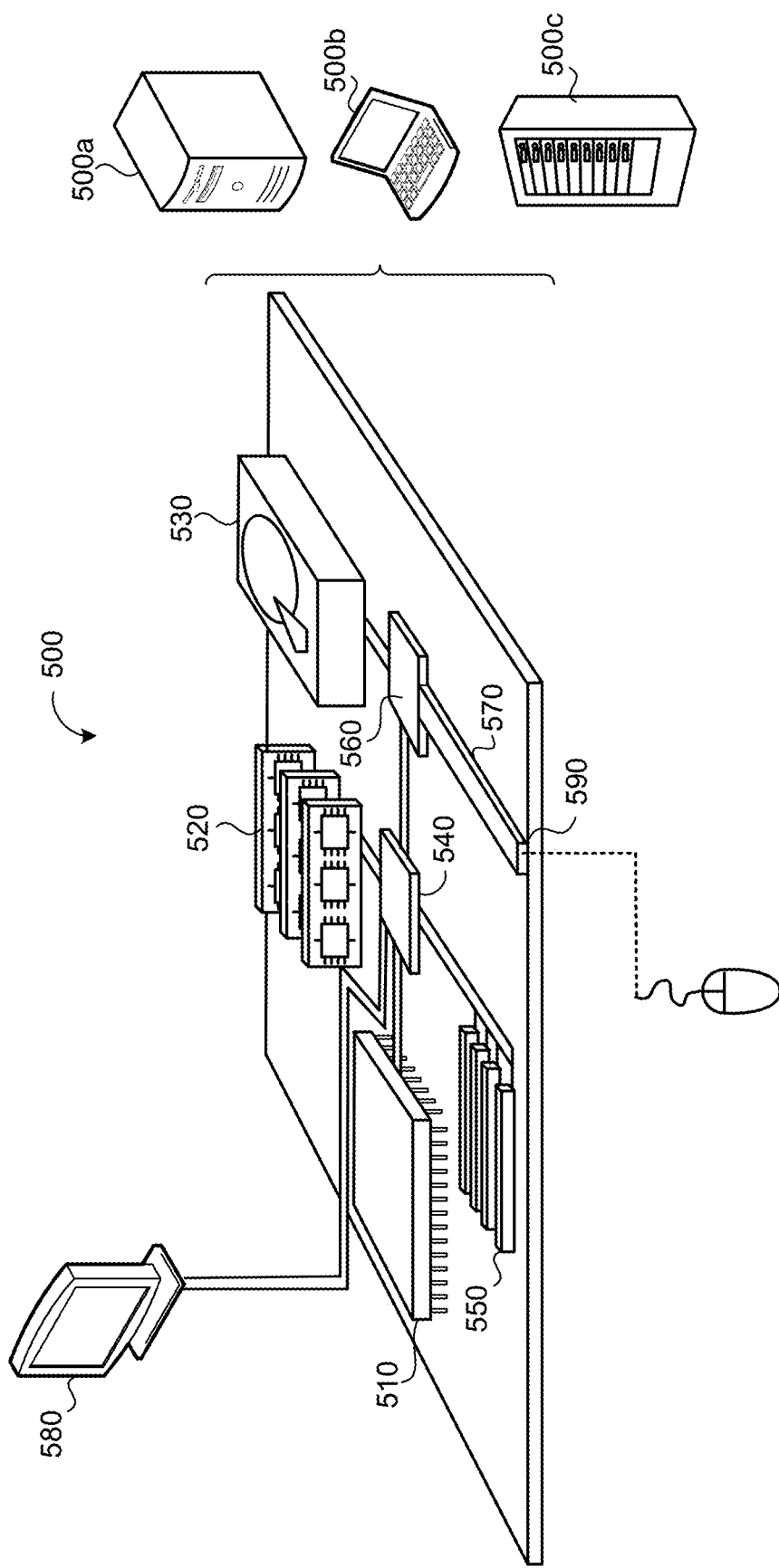
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/ controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
    receiving a contextual signal comprising image data captured by an image capture device in communication with an assistant-enabled device associated with a user;
    executing an event recognition routine to determine that the received contextual signal is indicative of an activity event;
    receiving playback features associated with media content being played back from the assistant-enabled device;
    determining, using a machine learning model configured to receive, as input, the received playback features, and generate, as output, a likelihood score, that the media content being played back from the assistant-enabled device interrupts an ability of the user to recognize the activity event; and
    based on determining that the media content being played back from the assistant-enabled device interrupts the ability of the user to recognize the activity event, reproducing the activity event for playback from the assistant-enabled device.

2. The computer-implemented method of claim 1, wherein determining that the media content being played back from the assistant-enabled device interrupts the ability of the user to recognize the activity event comprises determining, using an event interruption scorer configured to determine whether a received contextual signal recognized as being indicative of an event interrupts an ability of a user to recognize the activity event, that the media content being played back from the assistant-enabled device interrupts the ability of the user to recognize the activity event.

3. The computer-implemented method of claim 2, wherein the event interruption scorer comprises a heuristically-based model.

4. The computer-implemented method of claim 1, wherein receiving the contextual signal comprising the image data comprises receiving the contextual signal via an access point in communication with the image capture device and the assistant-enabled device via a network.

5. The computer-implemented method of claim 1, wherein executing the event recognition routine comprises executing a neural network-based classification model configured to receive the contextual signal as input and generate, as output, a classification result indicating whether the received contextual signal is indicative of the activity event.

6. The computer-implemented method of claim 1, wherein
    reproducing the activity event for playback from the assistant-enabled device is based on the likelihood score.

7. The computer-implemented method of claim 1, wherein the playback features comprise at least one of an audible level of the media content playing back from the assistant-enabled device, a media content type, or playback importance.

8. The computer-implemented method of claim 1, wherein reproducing the activity event comprises instructing the assistant-enabled device to playback a different type of media content.

9. The computer-implemented method of claim 1, wherein the operations further comprise:
    receiving user-defined configuration settings indicating user preferences for adjusting content playback settings of the assistant-enabled device,
    wherein reproducing the activity event comprises adjusting the content playback settings based on the user-defined configuration settings.

10. A system comprising:
    data processing hardware; and
    memory hardware in communication with the data processing hardware, the memory hardware storing instructions that when executed on the data processing hardware cause the data processing hardware to perform operations comprising, while an assistant-enabled device is playing back media content:
        receiving a contextual signal comprising image data captured by an image capture device in communication with an assistant-enabled device associated with a user;
        executing an event recognition routine to determine that the received contextual signal is indicative of an activity event;
        receiving playback features associated with media content being played back from the assistant-enabled device;
        determining, using a machine learning model configured to receive, as input, the received playback features, and generate, as output, a likelihood score, that the media content being played back from the assistant-enabled device interrupts an ability of the user to recognize the activity event; and
        based on determining that the media content being played back from the assistant-enabled device interrupts the ability of the user to recognize the activity event, reproducing the activity event for playback from the assistant-enabled device.

11. The system of claim 10, wherein determining that the media content being played back from the assistant-enabled device interrupts the ability of the user to recognize the activity event comprises determining, using an event interruption scorer configured to determine whether a received contextual signal recognized as being indicative of an event interrupts an ability of a user to recognize the activity event, that the media content being played back from the assistant-enabled device interrupts the ability of the user to recognize the activity event.

12. The system of claim 11, wherein the event interruption scorer comprises a heuristically-based model.

13. The system of claim 10, wherein receiving the contextual signal comprising the image data comprises receiving the contextual signal via an access point in communication with the image capture device and the assistant-enabled device via a network.

14. The system of claim 10, wherein executing the event recognition routine comprises executing a neural network-based classification model configured to receive the contextual signal as input and generate, as output, a classification result indicating whether the received contextual signal is indicative of the activity event.

15. The system of claim 10, wherein
reproducing the activity event for playback from the assistant-enabled device is based on the likelihood score.

16. The system of claim 10, wherein the playback features comprise at least one of an audible level of the media content playing back from the assistant-enabled device, a media content type, or playback importance.

17. The system of claim 10, wherein reproducing the activity event comprises instructing the assistant-enabled device to playback a different type of media content.

18. The system of claim 10, wherein the operations further comprise:
receiving user-defined configuration settings indicating user preferences for adjusting content playback settings of the assistant-enabled device,
wherein reproducing the activity event comprises adjusting the content playback settings based on the user-defined configuration settings.

* * * * *